United States Patent [19]

Sugihara et al.

[11] Patent Number: 4,608,244

[45] Date of Patent: Aug. 26, 1986

[54] ACETYLENE BLACK

[75] Inventors: Isao Sugihara; Akio Nishijima; Michio Toriguchi, all of Omuta, Japan

[73] Assignee: Denki Kagaku Kogyo Kabushiki Kaisha, Japan

[21] Appl. No.: 719,463

[22] Filed: Apr. 3, 1985

[30] Foreign Application Priority Data

Apr. 5, 1984 [JP] Japan .................... 59-68276

[51] Int. Cl.$^4$ .................... C01B 31/02; C09C 1/48
[52] U.S. Cl. .................... 423/445; 423/449; 423/450; 423/458
[58] Field of Search ............ 423/449, 450, 458, 460, 423/445

[56] References Cited

U.S. PATENT DOCUMENTS

| 4,279,880 | 7/1981 | Giot | 423/450 |
| 4,340,577 | 7/1982 | Sugawara et al. | 423/458 |
| 4,341,751 | 7/1982 | Kikka et al. | 423/460 |
| 4,452,771 | 6/1984 | Hunt | 423/450 |

Primary Examiner—Gregory A. Heller
Attorney, Agent, or Firm—Lowe, Price, LeBlanc, Becker & Shur

[57] ABSTRACT

Granular acetylene black excellent in dispersibility in rubber, plastic, and the like and conductivity-endowing effect and scarce in dust scattering. The granular acetylene black is made from acetylene black wherein the half-width of the 1355 cm$^{-1}$ band in the Raman spectrum is 55 cm$^{-1}$ or less and the amount of iodine adsorbed is 95 mg/g or more. The method for making the granular acetylene black comprises granulating the above acetylene black using ion exchange water as a wetting agent, drying the granulated acetylene black at temperatures below 300° C., and selecting particles whose hardness is less than 5 g/particle.

5 Claims, No Drawings

ACETYLENE BLACK

BACKGROUND OF THE INVENTION

The present invention relates to acetylene black, particularly acetylene black useful for obtaining granular acetylene black excellent in dispersibility in rubber, plastic, etc. and conductivity-endowing effect and low in dust scattering, to granular acetylene black made from the acetylene black, and to a method of making same.

Acetylene black has a partly-graphitized structure, and its properties are intermediate between those of graphite and amorphous carbon. Its particles form a steric chain structure (hereinafter called structure). Hence, it is excellent in conductivity, liquid absorbing ability, compressibility and elasticity. Also, it is carbon black of high carbon purity, which has few factors for contamination with impurities. Therefore, it is praised for its use, for example, as an additive to rubber, plastic, etc. (hereinafter solely called plastics) as a pigment, conductivity-endowing agent or the like.

The acetylene black, like other carbon blacks, is too difficult to treat in an intact state after production, and has a very small bulk specific gravity. The result of this is that transport of the material is difficult and its dust scattering is remarkable. In addition, users require that the treatment of it in bulk form be easy. Accordingly, under the existing circumstances, powdered acetylene black is granulated before use. The desirable properties of the resultant granulated acetylene black are described in "Instructions in Experimental Methods on Carbon Black for Rubber (JIS K 6221). Namely, the granulated acetylene black is required to be excellent in fluidity, difficult to be damaged and hard to scatter from the standpoint of the treatment. On the other hand, when used as an additive to plastics, it is required to be composed of soft particles which disperse readily.

The conventional granular acetylene black, however, has possessed the following disadvantage. It has given rise to a decrease in strength of plastics and a lack of smoothness of the plastic surface due to the poor dispersibility, whereby the functions inherent in the plastic have been greatly deteriorated.

In order to overcome the above drawback, the dispersibility has been raised by endowing the granular acetylene black with a strong shearing force using a processing machine, such as an extruder, injection molding machine or the like, excellent in dispersing ability. However, the strong shearing force given to the granular acetylene black has destroyed the structure of it, whereby the characteristics of the acetylene black have not satisfactorily been demonstrated. It has been also the cause for the deterioration of the functions inherent in the plastic. Furthermore, since the conventional granular acetylene black has possessed an original structure insufficient in strength, the above-described strong shearing force has undesirably promoted further destruction of the structure.

Hence, it has been desired that a plastic additive be provided comprising acetylene black having a strong structure and no dust scattering and being excellent in dispersibility.

SUMMARY OF THE INVENTION

The inventor has made many studies in order to meet the demand. As a result, he has found that acetylene black wherein the half-width of the 1355 cm$^{-1}$ band in the Raman spectrum is 55 cm$^{-1}$ or less and the amount of adsorbed iodine defined by JIS (Japanese Industrial Standard) K 1474 is 95 mg/g or more has a strong structure, and granular acetylene black (hardness of a granulated particle defined by the JIS: less than 5 g) made by granulating the acetylene black has excellent functions as a plastic additive. This finding has come to the completion of the invention.

Namely, the first aspect of the invention is acetylene black wherein the half-width of the 1355 cm$^{-1}$ band in the Raman spectrum is 55 cm$^{-1}$ or less and the amount of iodine adsorbed is 95 mg/g or more. In the second aspect of the invention, the acetylene black is granulated using ion exchange water as a wetting agent. The third aspect is a preferable method for making granular acetylene black espectially suitable as a plastic additive, which comprises granulating the acetylene black of the first aspect of the invention using ion exchange water as a wetting agent, drying the granulated acetylene black at temperatures below 300° C., and selecting particles having hardness of less than 5 g/particle.

According to the invention, acetylene black of a strong structure can be obtained and granular acetylene black can be made which is excellent in dispersibility in plastic, easily treated in transport and the like, and poor in dust scattering. Further, since granular acetylene black wherein the dispersibility in the plastic is further enhanced can be made, the conductivity-endowing effect can be greatly heightened without losing the characteristics of the plastic.

All the acetylene blacks of the invention can be used in pigments, antistatic sheets, ground plates for removing static electricity, belts, antennas for communication, video discs, coaxial cables, conductive paints, carbon materials in metallurgy, etc.

DETAILED DESCRIPTION OF THE PREFERRED EMBODIMENTS

It is known that the Raman spectra of various carbons differ according to the crystal structures. In natural graphite, a Raman band appears at 1575 cm$^{-1}$. In artificial graphite formed of microcrystals, active carbon formed of unorganized carbons, and amorphous carbon, however, the Raman band appears at 1355 cm$^{-1}$ rather than at 1575 cm$^{-1}$.

Acetylene black has two Raman bands at 1575 cm$^{-1}$ and 1355 cm$^{-1}$. The inventor has clarified for the first time that there is a high correlation between the half-width of the 1355 cm$^{-1}$ band and the conductivity-endowing effect when the acetylene black is used as an additive for plastics. The wavelength presenting the half-width of the 1355 cm$^{-1}$ band usually appears in the range of 1300 to 1400 cm$^{-1}$. The half-width is 100 cm$^{-1}$ or less. Acetylene black wherein the half-width is 55 cm$^{-1}$ or less has a strong structure, and withstands the above-described strong shearing force. It is excellent as a conductivity-endowing agent for plastics.

In this aspect, the invention is defined in such a way that the amount of absorbed iodine defined by JIS K 1474 is 95 mg/g or more for the following reason. The characteristic value is usually used as an index of the specific surface area of carbon black. The inventor has found that the value in acetylene black is an important factor dependent on the strength of the structure. Namely, the greater the amount of adsorbed iodine, the stronger is the structure of acetylene black. When the amount of iodine adsorbed is 95 mg/g or less, the structure of the acetylene black is too weak. Even if such acetylene black is granulated and used as an additive for plastics, the dispersibility can not be improved compared with the conventional granular acetylene black.

The acetylene black of the first aspect of the invention can be made by maintaining the thermal decomposition temperature of acetylene gas at above 2,000° C., preferably at above 2,200° C. A possible thermal decomposition furnace used is, for example, one described in Japanese Patent Application Laid-Open to the Public No. 56-90860. In the thus produced intact acetylene black, the amount of iodine adsorbed is inversely correlated with the half-width of the 1355 cm$^{-1}$ Raman band, and the smaller the half-width, the larger is the amount of iodine adsorbed.

The second aspect of the invention is characterized in that the acetylene black of the first aspect is granulated in order to make the transport and treatment easy and eliminate dust scattering when it is used as an additive for plastics. The granulated particle size is not especially limited, and usually adjusted to about 0.5 to 5 mm. However, the preferable size is such that the hardness of granulated particles is less than 5 g/particle as will be described in the third aspect. In the granulation, using the apparatus as in Japanese Patent Publication No. 52-31312, the powdered acetylene black is vigorously stirred in the presence of ion exchange water as a wetting agent, and then dried.

The third aspect of the invention relates to the method for favorably obtaining granular acetylene black having an appropriate property as an additive for plastics, namely, the hardness of granulated particles is less than 5 g/particle.

Even in the acetylene black having the excellent characteristics as described in the first aspect, when heated at high temperatures to remove the wetting agent after granulation, it undergoes an oxidation on the surface and the specific surface area increases. The results of this are a deterioration of the acetylene black and the disadvantage of a poor uniform dispersibility and a bad workability (fluidity). For overcoming the drawbacks the temperature for drying after granulation is restricted to below 300° C., preferably 80° to 150° C.

Furthermore, ion exchange water is used as a wetting agent, and the hardness of the granular acetylene black is less than 5 g/particle, for the following reasons.

The lower the hardness of the granulated particles, the better is the dispersibility of the particles in plastic and the deterioration of the functions inherent in plastics is reduced. The hardness of the granulated particles depends on the types of wetting agents used in granulation. The inventor has compared a solution containing a water-soluble organic matter such as a surface active agent with ion exchange water. As a result, it has been found that the former has an advantage over the latter in drying because of the smaller amount added while the granular acetylene black obtained using the former is hard, poor in dispersibility in plastics, and improper as an additive for plastics. Hence, the wetting agent has been limited to the ion exchange water. Also in the case where the ion exchange water is used, the hardness of granulated particles depends on the sizes, that is, the hardness increases with increasing size. Therefore, the inventor has measured the particle sizes and hardness of granulated particles obtained using the ion exchange water, selected particles having particle sizes corresponding to the hardness through screens, and made studies of the hardness of granulated particles and their dispersibility in plastic. As a result, it has been confirmed that granular acetylene black having a granulated particle hardness as defined by JIS K 6221 of less than 5 g is very excellent in dispersibility.

The invention will be described further in detail hereinunder by way of embodiments and comparative examples.

EMBODIMENTS 1-2 AND COMPARATIVE EXAMPLE 1

Using a vertical-type thermal decomposition furnace, acetylene was thermally-decomposed at 1,800° C., 2,000°0 C. and 2,200° C. to make powdered acetylene blacks. Measurements were carried out on the half-width of the 1355 cm$^{-1}$ band in the Raman spectrum and on the amount of adsorbed iodine defined by JIS K 6221 for each powdered acetylene black. The half-width was measured using Laser Raman Spectrometer (JRF-400D) of Nippon Electronics Co. The results of the measurements are shown in Table 1.

Further, 100 parts of each powdered acetylene black and 200 parts of ion exchange water were placed in a type 10B high-speed mixer of Mitsui Miike Seisakusho having a capacity of 9 liters and stirred at a stirring rate of 1,100 rpm for 5 minutes. The resultant granulated acetylene black was dried for 16 hours in a drier maintained at 105° to 110° C. to obtain granular acetylene black. The water content of each granular acetylene black is shown in Table 1.

Next, the particle size of each granular acetylene black (hardness of a granulated particle thereof is less than 5 g) was determined using the method defined by JIS k 6221. The particle size was less than 2 mm in each granular acetylene black. At the same time, measurements were carried out on the yield of granular acetylene black having a particle size of 2-0.1 mm from the starting (powdered) acetylene black and the hardness of it its hardness. The results of the measurements are shown in Table 1.

Then, 18 parts of each granular acetylene black having particle size of 2-0.1 mm, 100 parts of polyethylene resin (Mitsui Petrochemical Co.-made Ultrazex 2020L) and 1 part of age resistor (Sumitomo Chemical Co.-made Sumirizer BHT) were kneaded in a mixer at 120° C. for 10 minutes. The kneaded mixture was then extruded using an extruder (Toyo Seiki Co.-made laboplast mill R-65 type) of 20 mm bore (L/D: 25) at a temperature below 200° C. and at the screw revolution rate of 50 rpm to make sheets of 1.5 mm thickness and 20 mm width. The volume specific resistance of each sheet was measured in accordance with the standard SRIS 2301 of the Japan Rubber Association. The results are shown in Table 1.

TABLE 1

| Item | Embodiment 1 | Embodiment 2 | Comparative example 1 |
|---|---|---|---|
| Acetylene decomposing temperature (°C.) | 2000 | 2200 | 1800 |
| Half-width of 1355 cm$^{-1}$ band (cm$^{-1}$) | 52 | 45 | 60 |
| Amount of iodine adsorbed (mg/g) | 96 | 103 | 88 |
| Water content of granulated particle (% by weight) | 0.02 | 0.03 | 0.02 |
| Yield of particles of 2-01. mm particle size (% by weight) | 88 | 90 | 92 |
| Hardness of granulated particles (g/particle) | 2.8 | 3.5 | 3.1 |

TABLE 1-continued

| Item | Embodiment 1 | Embodiment 2 | Comparative example 1 |
| --- | --- | --- | --- |
| Volume specific resistance ($\Omega \cdot cm$) | $6 \times 10^3$ | $5 \times 10^3$ | $10^5$ or more |

As is apparent from Table 1, granular acetylene black wherein the half-width of the 1355 cm$^{-1}$ band is 55 cm$^{-1}$ or less and the amount of iodine adsorbed is 95 mg/g or more is very excellent in conductivity-endowing effect.

It is also found that acetylene black having the 1355 cm$^{-1}$ band the half-width of which is 30 cm$^{-1}$ to 55 cm$^{-1}$ and the amount of iodine adsorbed which is 95 mg/g to 120 mg/g is preferable in order to show the above effect.

EMBODIMENTS 3-4 AND COMPARATIVE EXAMPLE 2-4

Using the acetylene black of 2-0.1 mm or 2-3.2 mm particle size obtained in Embodiment 2, 0.5 part of the acetylene black and 100 parts of polyacetal resin (Polyplastic Co.-made Juracon M2702) were mixed in a V-type blender for 10 minutes. The mixture was then molded using an injection molding machine (Toshiba Machine Co.-made IS-45PN) at the molding temperature of 200° C. and at the injection pressure of 50 kg/cm$^2$ and mold clamping pressure of 100 kg/cm$^2$ to obtain a molding of 127 mm in length, 12.7 mm in width and 6.35 mm in thickness. Impact test defined by JIS K 7110 was carried out on each molding.

Further, the broken section of the molding after the impact test was observed under a microscope of 20 magnification to examine the despersion of acetylene black. The number of undispersed carbon-aggregated areas was visually checked.

For comparison, the same tests as in Embodiment 2 were carried out. The procedure of Embodiment 2 was followed but using granular acetylene black of 2-0.1 mm particle size obtained by stirring 100 parts of the powdered acetylene black obtained in Embodiment 2 and 150 parts of water solution of acetone (5% by weight) or 150 parts of water solution of 5%, by weight, of surface active agent (Kao Atlas Co.-Trade Mark "Pelex OTP").

The results of the tests are shown in Table 2.

made using ion exchange water as a wetting agent is high in impact strength and excellent in dispersibility.

In Embodiment 3, using granular acetylene black made under the conditions (drying temperature of granulated acetylene black; 350° C.), the same tests were carried out. As a result, the granular acetylene black was a little inferior in fluidity. The impact strength was 3.6 kg.cm/cm, and the number of carbon-aggregated areas was one/80.6 mm$^2$.

What is claimed is:

1. A method of producing granular acetylene black comprising the steps of
   thermally decomposing acetylene gas to obtain acetylene black having a half-width of the 1355 cm$^{-1}$ band in the Raman spectrum of not greater than 55 cm$^{-1}$ and an iodine adsorption of not less than 95 mg/g;
   stirring said acetylene black in a wetting agent consisting essentially of ion exchange water to granulate the same;
   drying the granulated acetylene black at a temperature below 300° C.; and
   selecting particles having a hardness of less than 5 g/particle.

2. A method of producing granular acetylene black according to claim 1, wherein said step of thermally decomposing acetylene gas is performed at a temperature of 2,000° C. to 2,200° C.

3. An acetylene black product produced according to the process comprising the steps of
   thermally decomposing acetylene gas to obtain acetylene black having a half-width of the 1355 cm$^{-1}$ band in the Raman spectrum of not greater than 55 cm$^{-1}$ and an iodine adsorption of not less than 95 mg/g;
   stirring said acetylene black in a wetting agent consisting essentially of ion exchange water to granulate the same;
   drying the granulated acetylene black at a temperature below 300° C.; and
   selecting particles having a hardness of less than 5 g/particle.

4. Acetylene black according to claim 3, wherein said half-width of the 1355 cm$^{-1}$ band in the Raman spectrum is 30 cm$^{-1}$ to 55 cm$^{-1}$.

5. Acetylene black according to claim 3, wherein said amount of iodine adsorbed is 95 mg/g to 120 mg/g.

TABLE 2

| Item | Embodiment 3 | Embodiment 4 | Comparative example 2 | Comparative example 3 | Comparative example 4 |
| --- | --- | --- | --- | --- | --- |
| Kind of wetting agent | Ion exchange water | Ion exchange water | Water Solution of acetone | Water solution of surface active agent | — |
| Granulated particle size (mm) | 0.1-2 | 2-3.2 | 0.1-2 | 0.1-2 | no addition |
| Hardness of granulated particles (g/particle) | 3.5 | 5.5* | 6.9 | 12.3 | — |
| Impact strength (kg · cm/cm) | 4.0 | 3.4 | 3.0 | 2.8 | 4.7 |
| Number of carbon-aggregated areas (number/80.6 mm$^2$) | 0 | 2 | 4 | 4 | — |

*Measured value for granulated particle of 2.6 mm particle size

As is apparent from Table 2, granular acetylene black (hardness of granulated particles: less than 5 g/particle)

* * * * *